United States Patent
Ghazvinian Zanjani et al.

(10) Patent No.: US 11,696,093 B2
(45) Date of Patent: Jul. 4, 2023

(54) MULTI-OBJECT POSITIONING USING MIXTURE DENSITY NETWORKS

(71) Applicant: QUALCOMM Incorporated, San Diego, CA (US)

(72) Inventors: Farhad Ghazvinian Zanjani, Almere (NL); Arash Behboodi, Amsterdam (NL); Daniel Hendricus Franciscus Dijkman, Haarlem (NL); Ilia Karmanov, Amsterdam (NL); Simone Merlin, San Diego, CA (US); Max Welling, Bussum (NL)

(73) Assignee: Qualcomm Incorporated, San Diego, CA (US)

( * ) Notice: Subject to any disclaimer, the term of this patent is extended or adjusted under 35 U.S.C. 154(b) by 202 days.

(21) Appl. No.: 17/182,153

(22) Filed: Feb. 22, 2021

(65) Prior Publication Data

US 2022/0272489 A1 Aug. 25, 2022

(51) Int. Cl.
*H04W 4/029* (2018.01)
(52) U.S. Cl.
CPC .................... *H04W 4/029* (2018.02)
(58) Field of Classification Search
CPC .................................................. H04W 4/029
USPC .................................................... 455/456.1
See application file for complete search history.

(56) References Cited

U.S. PATENT DOCUMENTS

2019/0317945 A1* 10/2019 Ezick .................. G06F 16/2477
2021/0357555 A1* 11/2021 Liu .......................... G06F 30/27

OTHER PUBLICATIONS

Alfakih, M., et al., "Gaussian Mixture Modeling for Indoor Positioning WIFI Systems", 2015 3rd International Conference on Control, Engineering & Information Technology (CEIT), IEEE, May 25, 2015 (May 25, 2015), XP033214747, pp. 1-5, DOI: 10.1109/CEIT.2015.7233072 [retrieved on Aug. 31, 2015] Abstract p. 1, Left-Hand Column, Line 1-p. 5, Right-Hand Column, Last Line.

Alfakih, M., et al., "Improved Gaussian Mixture Modeling for Accurate Wi-Fi Based Indoor Localization Systems", Physical Communication, Elsevier, Amsterdam, NL, vol. 43, Oct. 1, 2020 (Oct. 1, 2020), XP086364367, pp. 1-13, ISSN: 1874-4907, DOI: 10.1016/J.PHYCOM.2020.101218 [retrieved on Oct. 1, 2020] Abstract p. 1, Left-Hand Column, Line 1-p. 11, Right-Hand Column, Last Line.

Forbes, F., et al., "Component Elimination Strategies to Fit Mixtures of Multiple Scale Distributions", RSSDS 2019—Research School on Statistics and Data Science, Jul. 24, 2019 (Jul. 24, 2019), XP055913559, pp. 1-15, Retrieved from the Internet: URL: https://hal.archives-ouvertes.fr/hal-02415090/document [retrieved on Apr. 19, 2022] Abstract p. 1, Line 1-p. 14, Line 3.

(Continued)

*Primary Examiner* — Ted M Wang
(74) *Attorney, Agent, or Firm* — Patterson & Sheridan, L.L.P

(57) ABSTRACT

Certain aspects of the present disclosure provide techniques for object positioning using mixture density networks, comprising: receiving radio frequency (RF) signal data collected in a physical space; generating a feature vector encoding the RF signal data by processing the RF signal data using a first neural network; processing the feature vector using a first mixture model to generate a first encoding tensor indicating a set of moving objects in the physical space, a first location tensor indicating a location of each of the moving objects in the physical space, and a first uncertainty tensor indicating uncertainty of the locations of each of the moving objects in the physical space; and outputting at least one location from the first location tensor.

30 Claims, 8 Drawing Sheets

(56) References Cited

OTHER PUBLICATIONS

Girbau, A., et al., "Multiple Object Tracking with Mixture Density Networks for Trajectory Estimation", Arxiv.Org, Cornell University Library, 201 Olin Library Cornell University Ithaca, NY 14853, Jun. 22, 2021 (Jun. 22, 2021), XP081992994, 11 Pages, Abstract p. 1, Left-Hand Column, Line 1-p. 8, Right-Hand Column, Last Line.
International Search Report and Written Opinion—PCT/US2022/070281—ISA/EPO—dated May 9, 2022.
Karoliny, J., et al., "Mixture Density Networks for WSN Localization", 2020 IEEE International Conference on Communications Workshops (ICC Workshops), IEEE, Jun. 7, 2020 (Jun. 7, 2020), XP033796036, pp. 1-5, DOI: 10.1109/ICCWORKSHOPS49005.2020.9145035 [retrieved on Jul. 20, 2020] Abstract p. 1, Left-Hand Column, Line 1-p. 5, Left-Hand Column, Last Line.
Qian, W, et al., "Supervised and Semi-Supervised Deep Probabilistic Models for Indoor Positioning Problems", Neurocomputing, Elsevier, Amsterdam, NL, vol. 435, Jan. 12, 2021 (Jan. 12, 2021), XP086512025, pp. 228-238, ISSN: 0925-2312, DOI: 10.1016/J.NEUCOM.2020.12.131 [retrieved on Jan. 12, 2021] Abstract p. 228, Left-Hand Column, Line 1-p. 237, Right-Hand Column, Line 4.
Razavi, S.F., et al., "FRMDN: Flow-Based Recurrent Mixture Density Network", Arxiv.Org, Cornell University Library, 201 Olin Library Cornell University Ithaca, NY 14853, Aug. 5, 2020 (Aug. 5, 2020), XP081734211, pp. 1-19, Abstract p. 1, Left-Hand Column, Line 1-p. 12, Right-Hand Column, Last Line.

\* cited by examiner

MULTI-OBJECT POSITIONING USING MIXTURE DENSITY NETWORKS

INTRODUCTION

Aspects of the present disclosure relate to wireless positioning, and in particular to multi-object positioning.

Wireless perception and positioning have become increasingly prevalent in a variety of industries. For example, indoor positioning of objects (e.g., humans moving in a space) is being actively developed for its wide range of consumer and business applications. However, wireless positioning (particularly indoor positioning) has also proven to be a challenging problem, especially with respect to the high dimensions and complexities in modeling multipath signals within an indoor environment.

Current approaches to provide multi-object positioning generally require active positioning, where the objects being tracked are active participants in sending and receiving signals to aid the tracking. Although some efforts to achieve passive positioning have been made, these techniques are typically constrained to single-object tracking.

BRIEF SUMMARY

Certain aspects provide a computer implemented method to perform object positioning using a mixture density network, comprising: receiving radio frequency (RF) signal data collected in a physical space; generating a feature vector encoding the RF signal data by processing the RF signal data using a first neural network; processing the feature vector using a first mixture model to generate: a first encoding tensor indicating a set of moving objects in the physical space; a first location tensor indicating a location of each of the moving objects in the physical space; and a first uncertainty tensor indicating uncertainty of the locations of each of the moving objects in the physical space; and outputting at least one location from the first location tensor.

Certain aspects provide a method to train a mixture density network for object positioning, comprising: collecting a sequence of signal data records in a physical space while a plurality of objects move around the physical space; determining, for each signal data record, a ground truth location of each of the plurality of objects using one or more cameras in the physical space; computing a negative log-likelihood loss based in part on the ground truth locations; and refining one or more parameters of a first neural network and a first mixture model based on the negative log-likelihood loss such that the first neural network and first mixture model are trained to position multiple objects moving in the physical space.

Further aspects relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
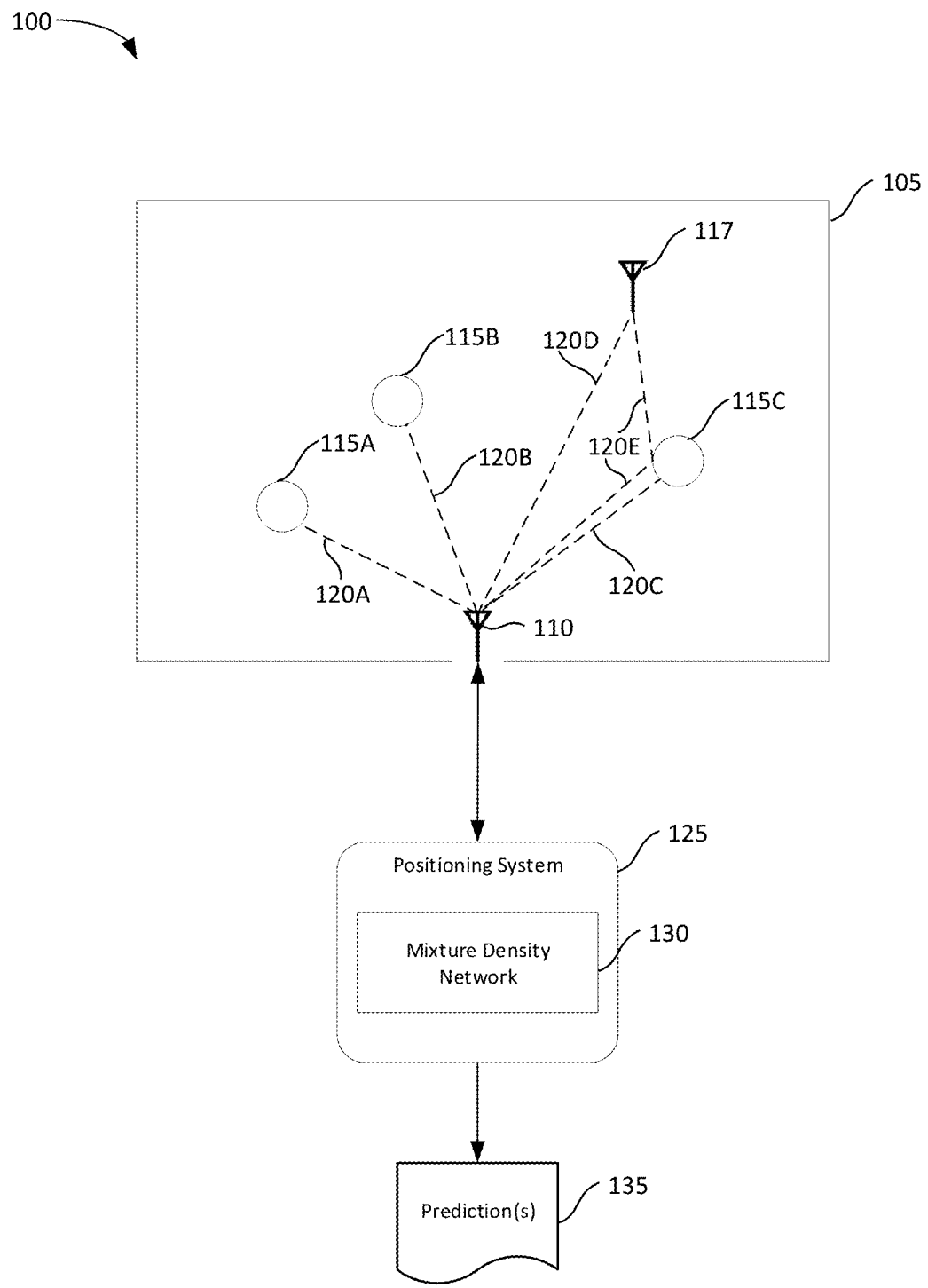
FIG. 1 depicts an environment including a positioning system configured to provide multi-object positioning using mixture density networks, according to some aspects disclosed herein.

Aspects of the present disclosure provide apparatuses, methods, processing systems, and computer-readable mediums for training and using mixture density networks to provide passive multi-object positioning.

Although analysis of signal characteristics has been useful to identify and track single targets, generalization to multiple objects in the space has proven difficult or impossible using current techniques. Aspects disclosed herein generally provide passive multi-object positioning based on wireless signal data. In aspects, the positioning is accomplished using radio frequency (RF) signal characteristics in a space. For example, in a wireless local area network (WLAN) deployment (such as a Wi-Fi™ network), the positioning system may collect and analyze channel state information (CSI) for the network in order to train one or more mixture density networks (MDNs) to predict the number of moving objects (e.g., people) in a space, the location of each object, and the uncertainty surrounding the location of each object. That is, various signals may be present in the space for one purpose (e.g., to provide wireless communication with computing devices in the space). Using aspects disclosed herein, noise or other attributes of the communication channel(s) can be used to characterize the physical environment (e.g., the location of objects in the space).

In an aspect, this CSI or other signal data implicitly reflects the signature of the propagation environment and all objects located in the wireless medium, including the presence of persons and other objects, allowing the system to infer the number and position of objects in a physical space. In some aspects, the positioning system utilizes one or more MDNs each comprising a backbone model (such as a neural network) and a mixture model.

The backbone model generally maps the input signal data into a feature space and generates a feature vector representing the data. In aspects, the dimensionality of this feature vector is a hyperparameter that can be adjusted to affect the speed, efficiency, and computational resources needed to train and utilize the models. This feature vector can then be passed to a trained mixture model that predicts the presence and location of objects in the space based on the feature vector.

Mixture models are probabilistic models representing probability distributions for given observations. That is, in an aspect, the mixture model is able to generate probability distributions as output, rather than simple coordinate locations (as is the case with most typical models). This allows the system to generalize well and accurately identify and track multiple objects simultaneously, while existing approaches are inherently limited to singular objects. The mixture models described herein are a framework of modeling conditional probability distributions (e.g., arbitrary conditional density functions p(t|x)), where t is a target variable (e.g., object location) and x is input data (e.g., signal data from the space). Further, in at least some aspects, the mixture models described herein utilize noise as a function of input. Thus, in addition to providing predictions on a target variable t (e.g., object location), in some aspects, the mixture model can additionally estimate the uncertainty for the predicted values.

By utilizing this model architecture, the positioning system is able to disambiguate multiple objects in the space and generate accurate predictions of their locations. In contrast, existing positioning approaches are typically either restricted to single-object tracking, or require active positioning to track multiple objects. Additionally, in aspects, the MDNs described herein can provide higher accuracy than other approaches, and require fewer parameters which results in faster convergence during training (i.e., less training time) and reduced computational resources to train the models. Further, the models described herein can provide significantly more spatial resolution as compared to existing solutions that rely on known maps of the environment. For example, while some existing solutions involve positioning objects by generating or identifying discrete pixels or regions on a map, aspects of the present disclosure can be used to generate continuous output, allowing the system to provide significantly more resolution in the predictions.

Example Environment Utilizing Mixture Density Network for Multi-Object Positioning FIG. 1 depicts an environment 100 including a positioning system 125 configured to provide multi-object positioning using mixture density networks 130, according to some aspects disclosed herein. The illustrated environment 100 includes a physical space 105 with a set of objects 115A-C and transceiver 110. Note that while physical space 105 is depicted in two-dimensions, it is representative of a three-dimensional physical space. As illustrated, the transceiver 110 is configured to transmit and receive signals in the physical space 105. The transceiver 110 may be a dedicated device (e.g., installed in order to provide wireless positioning), or may be a multi-use device (e.g., an access point installed to provide wireless connectivity, but which can also be used to provide wireless positioning).

As illustrated, the transceiver 110 can transmit signals 120A-E in the physical space 105, which interact with various elements (e.g., reflecting and refracting off them, being attenuated by them, etc.) in the space before returning to the transceiver 110. Such elements may generally include fixtures (e.g., buildings, walls, ceilings, floors, pillars, and the like) and moving objects (e.g., humans, animals, vehicles, and the like).

In the illustrated aspect, the transceiver 110 is being used to communicate with a device 117 (e.g., a computing device) in the space 105. As illustrated, some of the signals 120D and 120E from transceiver 110 reach device 117 (either directly, or after reflecting off of or otherwise interacting with one or more objects in the space 105), while others do not. For example, signal 120D arrives directly, while signal 120E reflects off the object 115C.

In an aspect, the objects being tracked are entirely passive in terms of signals emissions. That is, the signals 120 need not be received by a device (e.g., device 117) associated with any object, and devices need not actively transmit response signals back to transceiver 110. Instead, the positioning system 125 analyzes the signal characteristics caused by reflection, refraction, attenuation, and the like with respect to the objects (e.g., 115A-C). This allows the positioning system 125 to locate and track passive (in terms of signals emissions) objects such as humans, animals, vehicles, and the like as they exist and move within space 105. Although an indoor physical space 105 is depicted, the positioning system 125 may be utilized in conjunction with any type of environment (including outdoor spaces).

The transceiver 110 generally collects and provides characteristics about the signals 120 to a positioning system 125, though in other aspects, the transceiver 110 may provide raw signals to an intermediate system to determine various signal characteristics. These characteristics generally reflect the composite results of multipath fading, reflection, scattering, and/or attenuation in the physical space 105 between signal transmission and reception by transceiver 110. In various aspects, the signal characteristics may include, for example, the signal strength, the phase(s) of the signals, the carrier-frequency offsets of the signal(s), the signal-to-noise ratio(s) of the signal(s), the variance(s) of the signal(s), the mean(s) of the signal(s), the bandwidth of the signal(s), the peak-to-average ratio(s) of the signal(s), the subcarrier(s) of the signal(s), as well as the results of noise and distortion due to hardware imperfection. In some aspects, the positioning system 125 utilizes CSI data from the transceiver 110.

In aspects, the signals 120 (e.g., 120A-E) may take any number of paths while reflecting or refracting in the physical space 105. For example, some signals may reflect directly off the objects 115 before returning to the transceiver 110, while others may reflect off one or more other elements (such as the walls in the room) before reflecting off the objects 115 and returning to the transceiver 110 (known as multi-path). Objects 115 may also absorb and attenuate signals. Accordingly, it is possible that signals may reflect, refract, or attenuate in such a way that they never return to the transceiver 110, or return in a significantly degraded state. Some signals may reach active devices in the space (e.g., signals 120D and 120E) while others do not (e.g., signals 120A-C). The signals 120A-E depicted as interacting with the objects 115A-C are included for conceptual clarity, and there may of course be any number and variety of RF signals received by the transceiver 110. Similarly, there may be zero or more active devices (e.g., device 117) in the space. That is, the positioning system 125 may analyze characteristics of any signals in the space, regardless of whether they reach (or are transmitted by) another active device, or whether any other active devices are even present. For example, a single transceiver may transmit and receive RF signals (e.g., broadcast frames or any other signals), and detect the presence of (passive) objects in the space without the need for any active device receiving or transmitting any RF signals.

In the illustrated aspect of FIG. 1, based on the signal characteristics of any received signals (e.g., signals received by the transceiver 110), the positioning system 125 generates one or more predictions 135 (also referred to as inferences in some aspects) relating to the positions and/or movement of the objects 115 in the physical space 105. To do so, in the illustrated aspect, the positioning system 125 utilizes one or more MDNs 130.

Generally, the positioning system 125 uses received signal characteristics, along with some known ground truth data, to train the MDN 130. The ground truth data, such as an encoded position in two- or three-dimensional Cartesian coordinates, or in polar coordinates (to name just a few examples), may be provided, for example, by additional tracking systems, such as image-based tracking systems. At runtime (after training), MDN 130 can be used to process newly-received signal characteristics to generate the predictions 135.

In some aspects, to collect training data for the MDN 130, the positioning system 125 collects signal data in the space and, simultaneously, determines the number of objects (e.g., people) in the physical space 105, as well as the position of each, using any suitable sensory data. For example, in various aspects, the training data may be acquired by using depth sensors in the physical space 105, one or more cameras configured to capture images of the physical space 105, or other positioning systems, such as RFID-based positioning systems, and the like. Using this captured sensor data, the system is able to determine the position of each object in the space (e.g., using image analysis techniques).

This signal data can then be paired with the determined object locations (e.g., labeled position data), which is then used to train and refine the MDN 130 through supervised training. In at least one aspect, once the training data is collected, the system can disable the sensors (or they may be removed) and the MDN 130 can be used to identify object locations.

Predictions 135 may generally include one or more tensors generated based on the current signal data from the physical space 105. In one aspect, each prediction 135 includes an encoding tensor, a location tensor, and an uncertainty tensor.

The encoding tensor generally indicates the number of objects that are detected in the room. In one aspect, the encoding tensor is a vector of binary values, where a value of "one" indicates presence of an object, while a value of "zero" indicates there is no object. In another aspect, the values in the encoding tensor range from zero to one, where higher values indicate a greater likelihood that an object is present. The length of the encoding tensor is a hyperparameter controlling the number of unique objects the positioning system 125 can identify at a given time. For example, if the encoding tensor has a dimensionality of K=five, the positioning system 125 can track five unique objects at any time. That is, for each index k in the encoding tensor, the corresponding value indicates a probability that there is an object in the space.

In one aspect, the location tensor is generally a two-dimensional matrix with K rows, where each row corresponds to one row of the encoding tensor. That is, for each index k, the location tensor indicates a corresponding location. The width of the location tensor is defined by the number of relevant dimensions D in the physical space 105. That is, D is the number of dimensions that are tracked. For example, if the positioning system is configured to provide two-dimensional tracking (e.g., along the floorplan of the physical space 105 without concern for vertical position), the location tensor may have a width of two (e.g., indicating an x and y coordinate location using a Cartesian reference system, or an angle and distance using a polar reference system as just two examples). In aspects, any coordinate system of any dimensionality and with any suitable origin may be used. In at least one aspect, the system utilizes a Cartesian coordinate system with the origin placed at the location of the Transceiver 110 or at a corner of the space 105 (e.g., the bottom left corner may be 0,0 such that all other positions represent positive dimensional values).

The uncertainty tensor generally indicates uncertainty in the predicted locations, as indicated in the location tensor. In one such aspect, the uncertainty tensor is in the form of a general covariance matrix. That is, it is a square matrix (of rank D), where D is the number of dimensions being tracked (e.g., two-dimensional or three-dimensional tracking in a physical space), giving the variance between each pair of elements in the predicted vector or tensor (e.g. location tensor). As the output probability distribution is a mixture of K components, in an aspect, the dimensionality of the uncertainty tensor is K by D by D.

For example, in a three-dimensional positioning system 125 that tracks up to ten objects, the uncertainty tensor may be 10×3×3. For each index k, the uncertainty tensor indicates an uncertainty for the corresponding location (e.g., an uncertainty along each dimension) indicated by the same index k in the location tensor. That is, if the location tensor includes a predicted location in two dimensions (x, y), the uncertainty tensor indicates the uncertainty in each dimension.

In one aspect, for each value in the encoding tensor that exceeds a threshold value (e.g., 0.5), the index of the value is used to identify the corresponding location (from the location tensor) and uncertainty (from the uncertainty tensor). These locations and uncertainties can then be output as the identified objects and locations in the physical space 105. In at least one aspect, the system can use these location(s) to superimpose some indication of an object over a map or other type of visualization or representation of the space, allowing users to quickly ascertain the number and position of moving objects in the space.

In aspects, the positioning system 125 can distinguish between moving objects (e.g., the objects 115A-C) and static objects (e.g., walls and furniture) using a variety of techniques. In some aspects, the positioning system 125 utilizes the Doppler Effect to discriminate the pattern of a moving object from static objects. Any moving object that reflects or scatters RF signals, including humans, causes a Doppler Effect that is detectable by analyzing the changes in the signal across units of data (e.g., packets in a WiFi network) across time. In some aspects, because the MDN 130 can process multiple consecutive packets, it may extract a different set of features from the direction of moving objects, as compared to static ones. This can allow the positioning system 125 to identify moving objects and ignore static ones.

Additionally, in some aspects, the positioning system is able to utilize an additional consideration when the objects 115 correspond to humans in the space: known human-body reflection loss paths. The reflective loss is typically known to be different for different objects, and certain aspects of the loss can be an indication of a human body in the space. In addition to the property of the object surface which indicates the amount of electromagnetic absorption and scattering, the permittivity dictates the amount of signal that penetrates the object and the amount that reflects from it. Generally, different materials and objects have different surfaces and permittivity. In an aspect, such a reflection loss from the path, arrived from the direction of human body may be an indication of presence and location of the human in the environment (as opposed to static objects).

In some aspects, because the positioning system 125 utilizes data-driven learning techniques to distinguish moving and static objects, these factors may be learned implicitly during training, rather than explicitly determined and evaluated during runtime.

Figure 2:
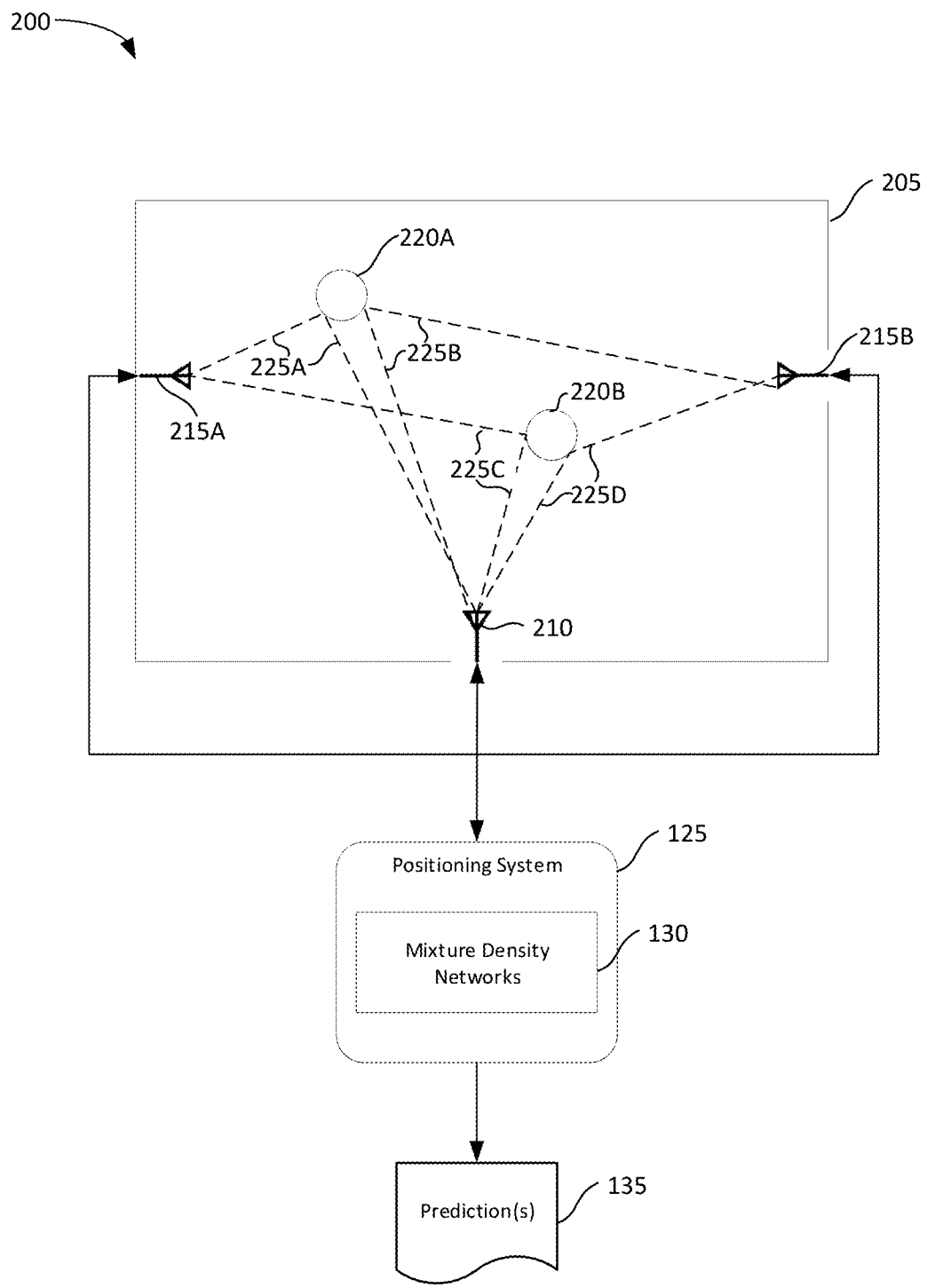
FIG. 2 depicts an environment including a positioning system configured to provide multi-object positioning using receiver-specific mixture density networks, according to some aspects disclosed herein.

Example Environment Utilizing Receiver-Specific Mixture Density Networks for Multi-Object Positioning FIG. 2 depicts an environment 200 including a positioning system 125 configured to provide multi-object positioning using receiver-specific mixture density networks 130, according to some aspects disclosed herein.

In the illustrated aspect, the physical space 205 includes a single transmitter 210 and two receivers 215A-B. In aspects, there may be any number of transmitters and receivers in the space. Further, in some aspects, each of the transmitter 210 and receives 215 may be transceivers, as discussed above. In some aspects, using multiple receivers may provide better coverage of the space, allowing for more accurate positioning. As illustrated, the transmitter 210 generally emits RF signals 225 into the physical space 205, which can interact with objects 220 in the space before being detected by one or more receivers 215.

For example, the signal 225A is reflected off the object 220A and received by the receiver 215A, while the signal 225B is reflected off object 220A and received by receiver 215B. Of course, in aspects, there may be any number of signals traversing the space, some of which interact with the objects 220 and some of which do not. Similarly, some of the signals may be received by one or more receivers 215 while others are not.

In the depicted environment 200, the positioning system 125 utilizes a set of MDNs 130 to perform object positioning. In one aspect, each MDN 130 corresponds to a particular receiver 215 in the physical space 205. That is, the signal data from each receiver 215 can be used to train a corresponding MDN 130 rather than a shared or overlapping model that is trained based on signals from both receivers 215A-B. Use of such receiver-specific models can beneficially provide multiple distinct perspectives of the environment, allowing multiple inferences to be generated for each point in time. In an aspect, during runtime, the signal data from each receiver 215A-B is analyzed using the corresponding receiver-specific MDN 130. In some aspects, the receiver-specific MDNs 130 act as an ensemble to generate the ultimate output prediction. This can improve the accuracy of the predictions (e.g., because models with low certainty can be ignored or assigned a low weight in favor of models that produced high-confidence output).

In some aspects, the positioning system 125 then aggregates the Predictions 135 output by each MDN 130. This may allow more accurate positioning in the space 205, as each model can learn the unique RF view for each receiver 215. Additionally, as objects move throughout the space, the distance from each object to each receiver can change significantly. Because objects nearer to a given receiver tend to produce stronger artifacts in the signal data, using multiple receivers 215 can allow the system to generate accurate predictions regardless of where the object is (e.g., regardless of whether it is particularly close to a single receiver).

Example Workflow for Multi-Object Positioning Using Mixture Density Networks

Figure 3:
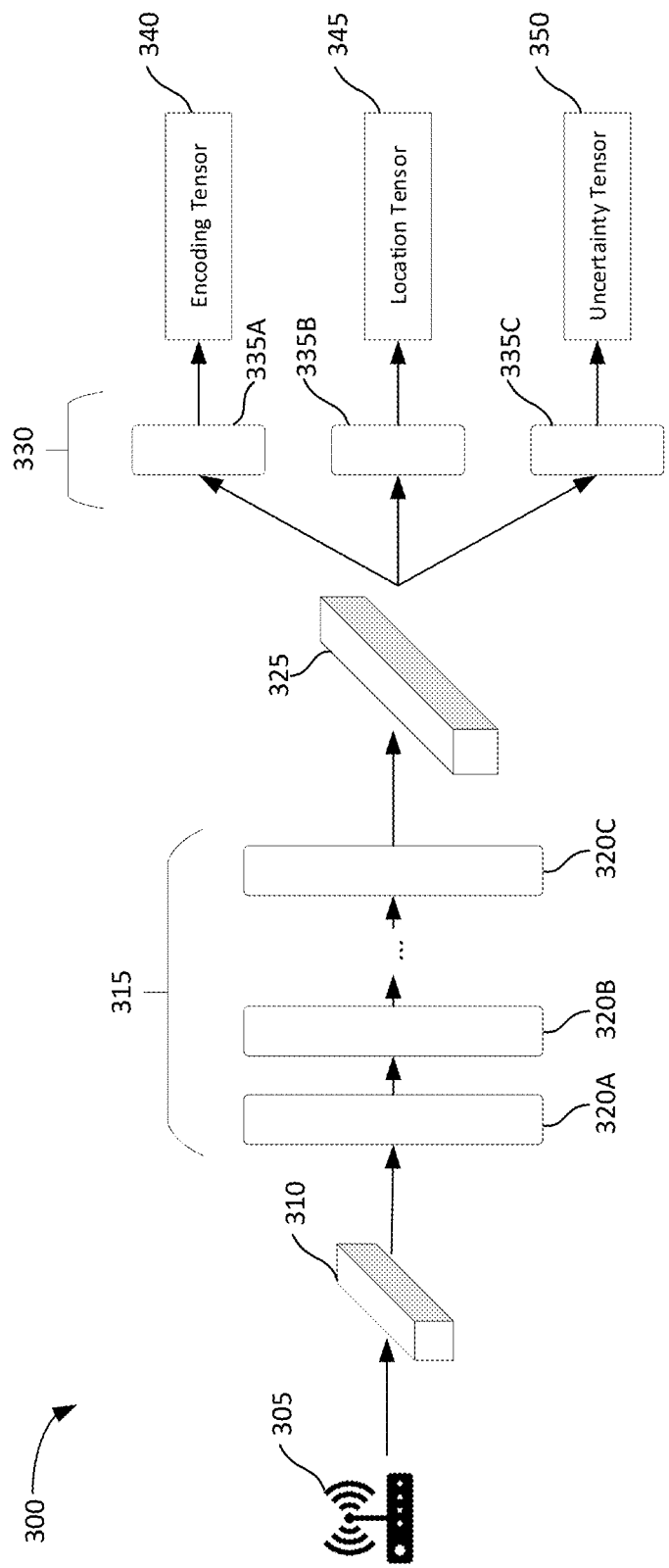
FIG. 3 illustrates a workflow to provide multi-object positioning using backbone machine learning models and mixture density models, according to some aspects disclosed herein.

FIG. 3 illustrates a workflow 300 to provide object positioning using backbone machine learning models and mixture density models, according to some aspects disclosed herein. In the illustrated aspect, the mixture density network is a combination of a backbone model 315 and a mixture model 330. In aspects, combining a backbone model 315 and mixture model 330 can allow the system to generate more accurate predictions that involve probability distributions, rather than simple coordinates.

As illustrated, signal data 310 is received from a receiver 305. In at least one aspect, the signal data 310 is encoded or vectorized in some form (e.g., by a preprocessing component), rather than raw data received directly from the receiver 305. Further, in some aspects, the signal data 310 is generated in part by performing one or more operations or transformations on the raw data, such as filtering, fast Fourier transformations, and the like. As discussed above, the signal data 310 can include channel state information, and generally indicates the characteristics of the RF medium in a physical space. For example, the characteristics may be the composite result of RF fading, RF reflection, RF refraction, RF scattering, and/or RF attenuation in the space. In some aspects, the signal data 310 additionally includes radar features such as angle of arrival, angle of departure, time of flight, and Doppler shift data for the RF signals.

In the illustrated workflow 300, the signal data 310 is provided to the backbone model 315. The backbone model 315 generally acts as a feature extraction portion of the overall MDN. In one aspect, the backbone model 315 is a neural network. This neural network can utilize a variety of architectures, including convolutional neural networks, multilayer perceptron networks, and the like. In at least one aspect, the backbone model 315 utilizes an off-the-shelf architecture, such as a ResNet18 architecture. In the illustrated aspect, the backbone model 315 includes a sequence of layers 310A-C. Although three are illustrated, there may be any number of layers in the backbone model 315. In one aspect, the backbone model 315 consists of a number of two-dimensional convolution layers. The layers 315 may also include other processing aspects, such as recurrent connections, pooling, normalization, non-linear operations, and the like.

As illustrated, the backbone model 315 outputs a feature vector 325. In some aspects, this feature vector 325 is a high-dimensional (e.g., 128 dimensional) vector representing salient features extracted by the layers 315 from the signal data 310. In aspects, the dimensionality of this feature vector 325 is a configurable hyperparameter. That is, the backbone model 315 can be trained to produce a feature vector 325 of any desired size. In some aspects, the system can utilize a pre-trained backbone model 315.

This feature vector 325 is then provided to a mixture model 330. In the illustrated workflow 300, the mixture model 330 consists of three linear layers 335A-C, each one producing a set of outputs (e.g., tensors). Specifically, in the illustrated aspect, the layer 335A outputs an encoding tensor 340, the layer 335B outputs a location tensor 345, and the layer 335C outputs an uncertainty tensor 350. Although the illustrated depiction suggests unidimensional tensors for ease of understanding, in aspects the encoding tensor 340, location tensor 345, and uncertainty tensor 350 may each be of any dimensionality. Although not depicted in the illustrated workflow 300, in at least one aspect, the layer 335A utilizes a sigmoid output function such that each value in the encoding tensor 340 ranges from zero to one.

Collectively, in one aspect, the encoding tensor 340, location tensor 345, and uncertainty tensor 350 can represent a set of Gaussian distributions when combined. In such an aspect, the position of each object in the space is modeled as a multi-dimensional probability distribution. For each index k, the value indicated in the location tensor 345 represents the center of a Gaussian distribution that corresponds with the location of the object. The value indicated in the uncertainty tensor 350 indicates the uncertainty of that position, and controls the covariance of the Gaussian distribution. That is, the location tensor 345 effectively encodes the mean of a Gaussian probability distribution for each dimension, and the uncertainty tensor encodes the variance of the Gaussian probability distribution for each dimension.

Further, in such an aspect, the corresponding value in the encoding tensor 340 can be used as the contribution weight to show how many objects are in the environment and whether the other tensors have usable data. That is, for each index k, the corresponding value in the encoding tensor 340 can be compared to one or more thresholds to determine whether the corresponding values in the location tensor 345 and uncertainty tensor 350 contain valid data (e.g., likely represent the location of an object in the space) or junk data (e.g., it is not likely they correspond to an object in the space). In some aspects, the threshold used to evaluate the encoding tensor can be determined using cross-validation technique on a validation set in order to determine an optimal value.

In an aspect, the entire MDN (including the backbone model 315 and the mixture model 330) is trained end-to-end using backpropagation and gradient descent. To collect labeled training data, in an aspect, timestamped signal data is collected for the physical space while one or more sensors (e.g., cameras) capture data from the space. This captured data can be used to identify the number and location of each moving object in the space (e.g., using image analysis). By correlating the signal data and sensor data based on time, the system can generate labeled training data where each element of signal data (e.g., the RF characteristics experienced at a particular timestamp) is labeled with the number and location of each moving object in the space.

In at least one aspect, the ground truth label for the encoding tensor 340 is a binary vector where a value of one indicates presence of an object and a value of zero indicates no object. For example, if three objects are present in the space at a given time, the encoding label associated with the RF data from that time may be [1, 1, 1, 0, . . . , 0].

In one aspect, the permutation of this vector does not affect its represented quantity of individual objects. That is, a first vector [0,1,0,1] and a second vector [1,0,1,0] are considered equivalent, as both indicate the presence of two objects. In such an aspect, for comparing the real ground truth encoding vector with the generated encoding tensor 340, the positioning system computes the distance between the two tensors.

In another aspect, the order of filling the encoding tensor begins from the first element in the tensor. For example, [0, 0, 0, 0] indicates that no moving objects are present in the room, [1, 0, 0, 0] indicates the presence of one object, and [1, 1, 0, 0] indicates the presence of two. In such an aspect, comparison between the ground truth label and the generated encoding tensor 340 can be accomplished by computing binary cross-entropy loss between each corresponding element of the two tensors.

To provide a ground truth for the location tensor 345, the positioning system (e.g., 125 in FIG. 1) may use the determined coordinate location of each object in the space. In one aspect, the ground truth label for the uncertainty tensor 350 is a fixed and predefined uncertainty (e.g., 10 cm in each direction). In another aspect, the ground truth uncertainty is decided based on the error in measuring the location of people to generate the training data (e.g. using one or more cameras).

To train the MDN, in one aspect, the positioning system iteratively utilizes signal data associated with a given timestamp (e.g., collected at a moment in time) as input and the superposition of all Gaussian distributions in the ground truth for the timestamp, and computes a loss by comparing the generated tensors to the ground truth. That is, because each object in the space is associated with a corresponding ground truth Gaussian distribution and the model is trained to track multiple objects simultaneously, the separate Gaussian distributions for each object can be combined into a superposition ground truth for each training record.

In an aspect, the loss comprises two terms: a negative log-likelihood loss ($\mathcal{L}_{NLL}$) between the generated tensors and ground truth, and cross-entropy loss ($\mathcal{L}_{CE}$) over the generated encoding tensor and the ground truth tensor that represents the number of people or other objects in the room. By utilizing backpropagation and gradient descent, the parameters of the backbone model 315 and mixture model 330 are iteratively refined.

In at least one aspect, in addition to utilizing covariance matrices as ground truth for the uncertainty tensor 350, the positioning system can also use the covariance matrices to encode the target(s) moving orientation in the space.

Generally, each covariance matrix generalizes the notion of variance to multiple dimensions. In some implementations, the system uses a diagonal covariance matrix with a constant unique value on the diagonal. This indicates that the system considered a constant and equal uncertainty for each axis around the center point. In some aspects, the positioning system can encode the direction of movement of each object by replacing the diagonal covariance matrix with a full matrix, where the elements of the matrix represent the orientation of the movement in the plane of the space.

In an aspect, the covariance matrix indicates the variance between each pair of elements of the location tensor. As the input to the model can be a sequence of N consecutive packets, the movement direction/orientation of the objects, while these N packets are received, can be encoded by different scaling of the variances in the matrix. For example, suppose an object is moving diagonally in a two-dimensional Cartesian coordinate system with the angle of 45 degrees. In one aspect, the main diagonal of the covariance matrix can be made larger than its two off-diagonal entries. In such a case, by predicting a similar covariance matrix, the MDN is able to decode the orientation/direction of motion at its output. In such an aspect, the predicted uncertainty tensor 350 can therefore be evaluated to decode the movement orientation/direction of each object.

In some aspects, the system estimates the location of each target object without temporal dependency. That is, the system may evaluate the signal characteristics for a given moment or window of time in order to predict the location(s) and/or movement of the object(s) during that moment or window of time, without consideration of any prior signal characteristics and/or estimated locations. In at least one aspect, however, the system can use various techniques to incorporate this prior data. For example, the system may use a temporal smoothing technique (e.g., a Kalman filtering process) as a post-processing stage. As another example, the system may use recurrent layers (e.g. LSTM, GRU) in the network's architecture, or replace standard convolution operators with casual convolution operators with kernels applied on the sequence of input, in order to consider this temporal data.

In some aspects, the MDN is initialized with randomized weights and iteratively refined using training data. In at least one aspect, the model can be regularized based on known information about the geometry of the environment. For example, the positioning system may receive a two-dimensional map of the building floorplan where the system is to be deployed. In one aspect, where the presence of a person or other object is unlikely, the map can indicate a low probability value.

As discussed above, the output of the MDN is the position of moving objects(s) in a coordinate system. In general, by considering no prior information about the environment geometry, the probability of presence of a person at any given point has a uniform distribution. However, deploying the system in buildings and other physical spaces imposes some constraints on the presence of objects in the space. For example, objects should not be detected at places that are already occupied by other objects (e.g., walls, cabinets, and the like). Providing an indication of these static objects as prior information can improve the positioning task, as the model can learn to penalize detections in these predefined non-valid locations, such that locations outside of the valid regions are assigned lower probability values when generating location tensors. That is, the system can learn to ignore the regions where the presence of an object is unlikely. This can reduce the false positive detection error significantly.

Figure 4:
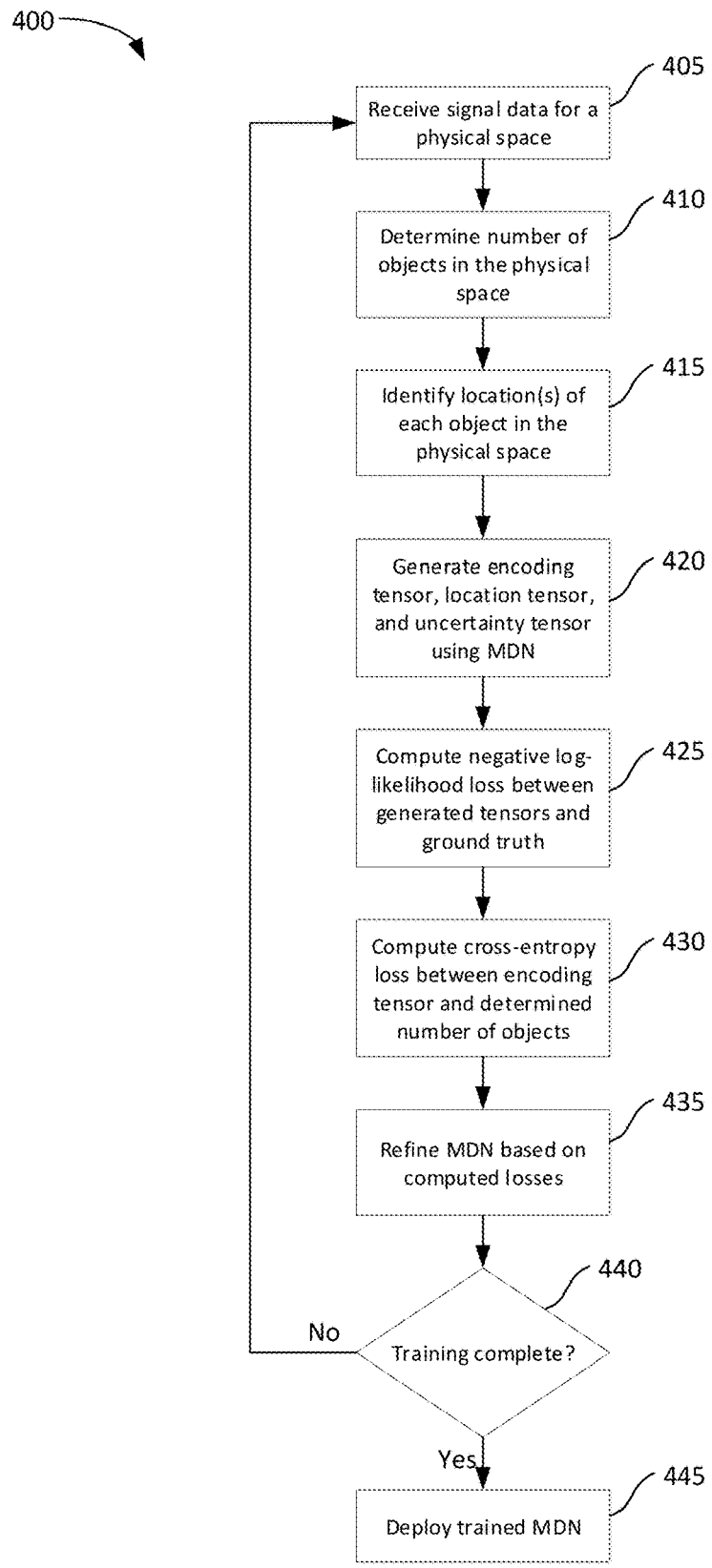
FIG. 4 is a flow diagram illustrating a method for training mixture density networks to provide multi-object positioning, according to some aspects disclosed herein.

Example Method for Training Mixture Density Networks for Multi-Object Positioning FIG. 4 is a flow diagram illustrating a method 400 for training mixture density networks to provide multi-object positioning, according to some aspects disclosed herein. In one aspect, the method 400 is performed by the positioning system 125 of FIG. 1. In other aspects, one or more other components or systems may perform the method 400 to train a MDN to position and track any number of objects in a space.

The method 400 begins at block 405, where the positioning system receives signal data for a physical space. In one aspect, as discussed above, this signal data includes characteristics of one or more RF signals in the space. For example, the signal data may comprise CSI from one or more wireless networks in the space. As discussed above, the RF signals may be used for purposes other than object identification (e.g., for communication between computing devices). Nevertheless, the characteristics of these signals may be used by aspects disclosed herein to perform object positioning. The signal data generally represents the RF environment and implicitly encodes the positions of objects in the space.

The method 400 then continues to block 410, where the positioning system determines the number of objects that are present in the space, as of the time when the signal data was collected. In one aspect, the positioning system does so by analyzing one or more images captured by one or more cameras at the corresponding time, and identifying objects (e.g., people) in each image. This determined number of users can be used as the ground truth for the signal data. In some aspects, rather than determining the actual number of objects, the system can simply detect the presence of one or more objects in the space.

At block 415, the positioning system identifies the location of each identified object in the space. As discussed above, in some aspects, the positioning system utilizes image analysis of one or more images captured of the space in order to determine the location of each moving object in the space, though other active positioning methods can be used as described above. In an aspect, these determined locations serves as the ground truth for the generated locations. In at least one aspect, the positioning system also generates or determines a ground truth uncertainty for the positions. This can include, without limitation, utilizing a predefined uncertainty (e.g., ten centimeters), determining the uncertainty introduced by the location determination (e.g., the uncertainty or error in the image analysis), and the like.

The method 400 then proceeds to block 420, where the positioning system uses the MDN to generate an encoding tensor, a location tensor, and an uncertainty tensor, as discussed above. To do so, the positioning system generally provides the signal data as input to a backbone model (e.g., a neural network) which outputs a feature vector. This feature vector is then used as input to a mixture model, which includes three linear layers, each of which correspond to a respective output tensor.

At block 425, the positioning system compares the ground truth and the generated tensors to compute a negative log-likelihood loss $\mathcal{L}_{NLL}$ for the predictions. In one aspect, the positioning system does so using Equation 1 below, where θ represents joint parameters of the backbone and mixture model. As discussed above, the system may generally utilizes a discrete backbone network and a mixture model. In aspects, the system architecture is not limited to the specific architecture of the backbone model. Despite this split, however, the positioning system treats the models as a unified model that is trained end-to-end. Thus, θ consists of all learning parameters: those of both the backbone model and the mixture model. These joint parameters are trained jointly, and are used together for the prediction.

In Equation 1 below, K is the maximum number of moving objects that can be tracked, $\pi_{gt}$ is the ground truth binary vector indicating the number of objects present, $\mu_{gt}$ is the ground truth coordinate positions of each object in the space, and $\Sigma_{gt}$ is the ground truth covariance matrices representing the position uncertainty (and, in some aspects, the movement direction) of each object.

$$\mathcal{L}_{NLL} = -\sum_{batch} \ln\left[\sum_i^K p(\pi_{gt}, \mu_{gt}, \Sigma_{gt} \mid \pi_i, \mu_i, \Sigma_i, \theta)\right] \quad \text{Equation 1}$$

The method 400 then continues to block 430, where the positioning system computes the cross-entropy loss $\mathcal{L}_{CE}$ between the ground truth encoding tensor (generated based on the determined number of objects in the space) and the generated encoding tensor (generated by the MDN to predict the number of objects). In one aspect, the overall loss $\mathcal{L}$ for the model can then be computed as the $\mathcal{L}_{NLL} + \lambda \mathcal{L}_{CE}$, where λ is a configurable hyperparameter corresponding to the contribution weight of the cross-entropy loss.

In aspects, the contribution weight λ between the loss terms can be adjusted by experimentation and/or using a cross-validation set. Generally, decreasing λ leads to emerging spurious predictions along with true detection and localization of objects. Such a spurious detection happens because the predicted distribution not only has peaks on the correct location of objects, but also on all K locations that can be tracked in the environment. On the other hand, increasing λ degrades the positioning performance, but the model may work better in predicting the number of objects in the space (even if it is less accurate in estimating their locations).

At block 435, this loss is then used to refine the MDN via backpropagation and gradient descent. That is, the weights or other parameters of the backbone network and the mixture model can both be refined based on the computed losses. In this way, the MDN iteratively learns to generate more accurate output tensors.

The method 400 then continues to block 440, where the positioning system determines whether training has completed. In one aspect, this includes evaluating the accuracy or performance of the model. If the model performance meets or exceeds some defined criteria, in an aspect, the positioning system determines that training is complete and the method 400 proceeds to block 445. In other aspects, the criteria may include determining whether additional training data is available. If so, training is not complete. In yet another aspect, the criteria may include a determined number of training iterations have been completed.

If training is not complete, then the method 400 returns to block 405 to process the next set of input data. If training is complete, then the method 400 continues to block 445, where the positioning system deploys the trained MDN for use during runtime. This allows the positioning system to identify the number and position of objects in the space based on RF signal characteristics (e.g., the characteristics of a wireless network signal) without use of other sensor devices (such as cameras).

Figure 5:
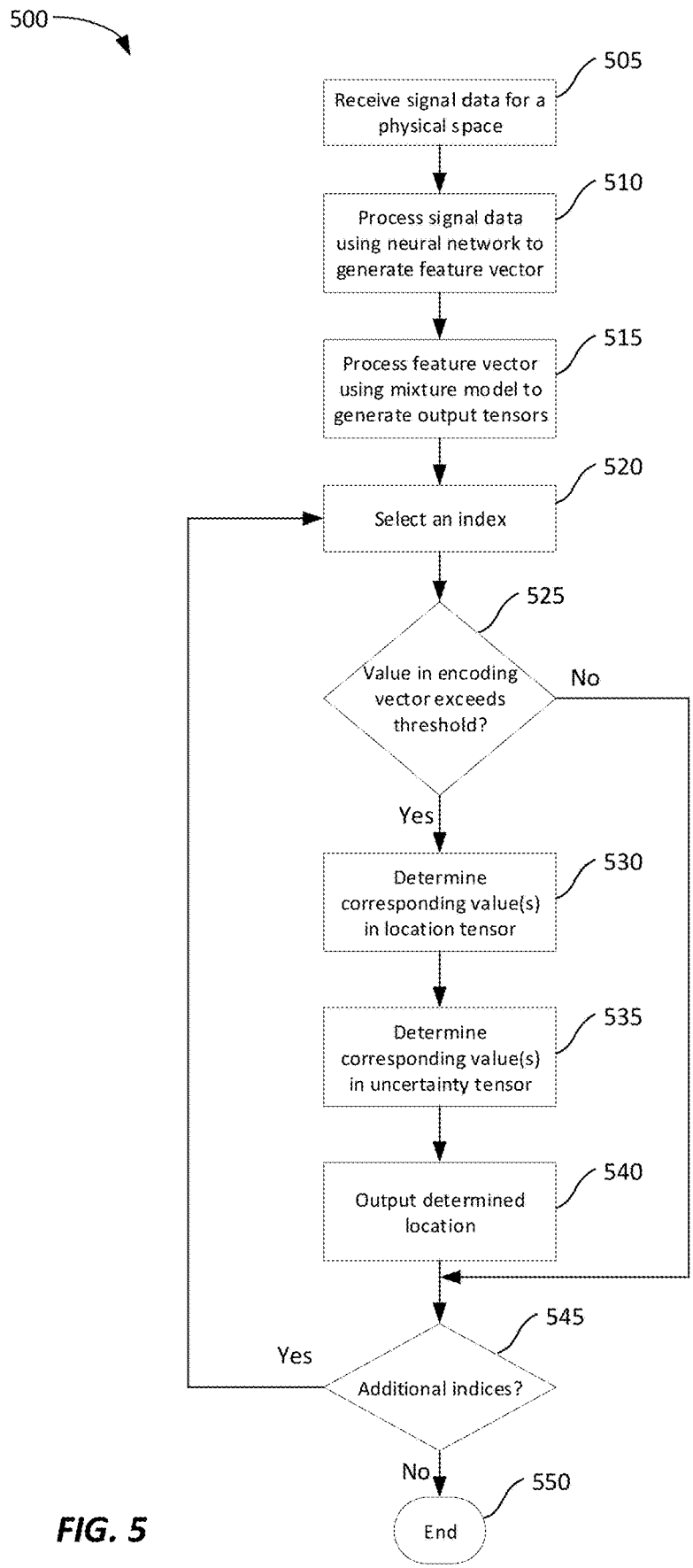
FIG. 5 is a flow diagram illustrating a method for analyzing signal data using mixture density networks to provide multi-object positioning, according to some aspects disclosed herein.

Example Method for Utilizing Mixture Density Networks for Multi-Object Positioning FIG. 5 is a flow diagram illustrating a method 500 for analyzing signal data using mixture density networks to provide multi-object positioning, according to some aspects disclosed herein. In one aspect, the method 500 is performed by a positioning system (e.g., positioning system 125 of FIG. 1).

The method 500 begins at block 505, when signal data for a physical space is received by the positioning system. As discussed above, the signal data may correspond to RF signals used for purposes other than object identification (e.g., for communication between computing devices). Nevertheless, the characteristics of these signals may be used by aspects disclosed herein to perform object positioning. In one aspect, the signal data includes CSI from one or more wireless networks in the space. As discussed above, the signal data generally reflects the RF environment in the space as a result of signals interacting with physical objects in the space.

The method 500 then continues to block 510, where the positioning system processes the received signal data using a trained backbone neural network to generate a feature vector. That is, the positioning system can provide the signal data as input to the network, which generates a feature vector at its output.

At block 515, the positioning system processes this feature vector using a trained mixture model to generate a set of output tensors indicating the location of any objects in the space. In one aspect, the set of output tensors includes an encoding tensor indicating the number of objects, a location tensor indicating the coordinate position of each identified object, and an uncertainty tensor indicating the location-uncertainty for each identified object. The method 500 then continues to block 520.

At block 520, the positioning system selects an index value k for analysis. In an aspect, the positioning system may select the index using a variety of techniques, as the positioning system will iterate through each index sequentially or in parallel in order to evaluate the output tensors.

The method 500 proceeds to block 525, where the positioning system determines whether the corresponding value at the selected index k in the encoding tensor exceeds a defined threshold or satisfies some other defined criteria. In one aspect, this threshold indicates that the value must be greater than 0.5. In some aspects, the threshold can be configured manually or automatically in order to prevent false-positives (e.g., mistakenly identifying object(s) where none exist) and false negatives (e.g., mistakenly determining that no object is in the space).

If the corresponding value in the encoding vector does not meet the criteria, then the method 500 continues to block 545. If the value satisfies the criteria, however, then the method 500 continues to block 530. At block 530, the positioning system identifies the corresponding value at the selected index k in the location tensor. That is, the positioning system determines the coordinates indicated in the location tensor for the selected index. As discussed above, in an aspect, the location tensor may generally include coordinate values at each index, but only a subset of these values are valid. By evaluating the encoding tensor, the positioning system can determine which location values are valid.

The method 500 then continues to block 535, where the positioning system identifies the corresponding value at the selected index k in the uncertainty tensor. That is, the positioning system determines the uncertainty values indicated in the uncertainty tensor for the selected index. As discussed above, in an aspect, the uncertainty tensor may generally include values at each index, but only a subset of these values are valid. By evaluating the encoding tensor, the positioning system can determine which uncertainty values are valid.

At block 540, the positioning system then outputs at least the determined location from the location tensor. In some aspects, the positioning system also outputs the determined uncertainty. In aspects, this output can take any number of forms. For example, in one aspect, the positioning system superimposes an indication of the location on a map of the space output on a graphical user interface (GUI) (e.g., by placing an object or some other identifier at the location on the map). In some aspects, the positioning system also outputs the uncertainty, such as by depicting a heatmap surrounding the predicted location, or an enclosing circle (or other shape) around the predicted location indicating a zone of uncertainty.

In at least one aspect, if the uncertainty tensor also encodes movement direction, then the positioning system can also output an indication of this direction (e.g., using arrows to indicate the direction the object is moving). Additionally, in some aspects, once all indices have been iterated through, the positioning system may also output an indication of the total number of objects detected.

The method 500 then continues to block 545, where the positioning system determines whether there is at least one index remaining that has not been evaluated. If so, then the method 500 returns to block 520. Otherwise, the method 500 terminates at block 550.

In some aspects, the method 500 is repeated each time new signal data is received. For example, if signal data is received over time, then the positioning system can iteratively process the data and output updated location(s) over time. This allows object movement to be tracked over time.

Example Method for Utilizing Mixture Density Networks

Figure 6:
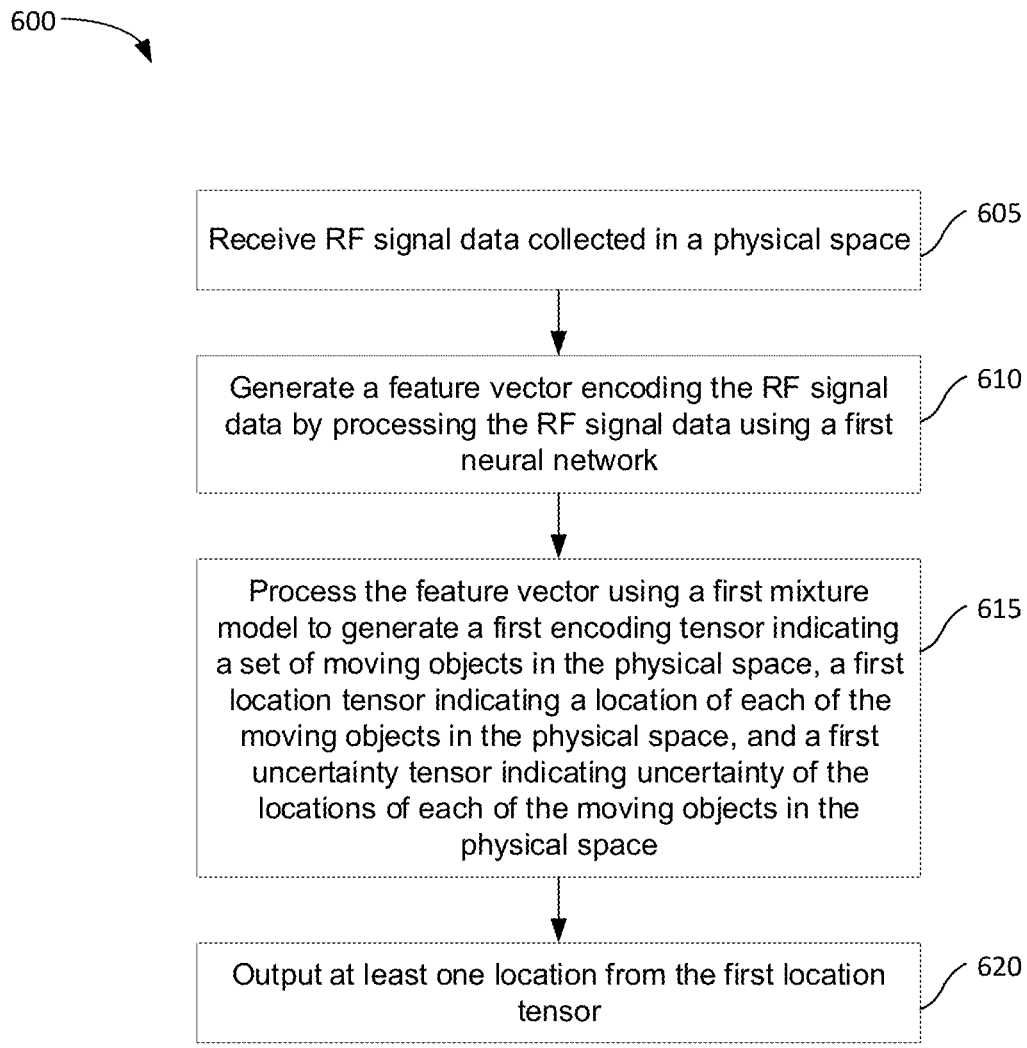
FIG. 6 is a flow diagram illustrating a method for using a mixture density network to provide object positioning based on signal data, according to some aspects disclosed herein.

FIG. 6 is a flow diagram illustrating a method 600 for using a mixture density network to provide object positioning based on signal data, according to some aspects disclosed herein.

The method 600 begins at block 605, where a positioning system receives RF signal data collected in a physical space.

In some aspects, the RF signal data comprises characteristics of RF signals in the physical space. Additionally, in some aspects, the characteristics are a result of at least one of: RF fading, RF reflection, RF refraction, RF scattering, or RF attenuation.

At block 610, the positioning system generates a feature vector encoding the RF signal data by processing the RF signal data using a first neural network.

The method 600 then continues to block 615, where the positioning system processes the feature vector using a first mixture model to generate a first encoding tensor indicating a set of moving objects in the physical space, a first location tensor indicating a location of each of the moving objects in the physical space, and a first uncertainty tensor indicating uncertainty of the locations of each of the moving objects in the physical space.

In some aspects, the first encoding tensor is a unidimensional tensor specifying a plurality of values, where each respective value of the plurality of values in the first encoding tensor indicates a probability that a respective moving object is in the physical space.

In some aspects, for each respective value of the plurality of values in the encoding tensor, the first location tensor specifies a respective mean of a respective Gaussian distribution and the first uncertainty tensor specifies a respective covariance matrix of the respective Gaussian distribution.

Further, at block 620, the positioning system outputting at least one location from the first location tensor. In some aspects, outputting the at least one location comprises indicating the at least one location on a graphical map of the physical space.

In some aspects, the first neural network and first mixture model were trained based on data collected from a first receiver, a second neural network and second mixture model were trained based on data collected from a second receiver, and the method 600 further comprises aggregating a second location tensor from the second mixture model with the first location tensor from the first mixture model prior to outputting the at least one location.

In some aspects, the method 600 further comprises determining a direction of movement for each moving object based on the first uncertainty tensor.

In some aspects, the method 600 further comprises identifying a set of indices in the first encoding tensor having a value that exceeds a minimum threshold. In one such aspect, for each respective index in the set of indices, the method 600 includes identifying a corresponding location in the first location tensor and outputting the identified corresponding locations in the first location tensor.

In some aspects, the first mixture model was trained based at least in part on a map of the physical space, where the map indicates valid regions which can be occupied by moving objects and locations outside of the valid regions are penalized when generating the first location tensor such that locations outside of the valid regions are assigned lower probability values when generating the first location tensor.

Example Method for Training Mixture Density Networks

Figure 7:
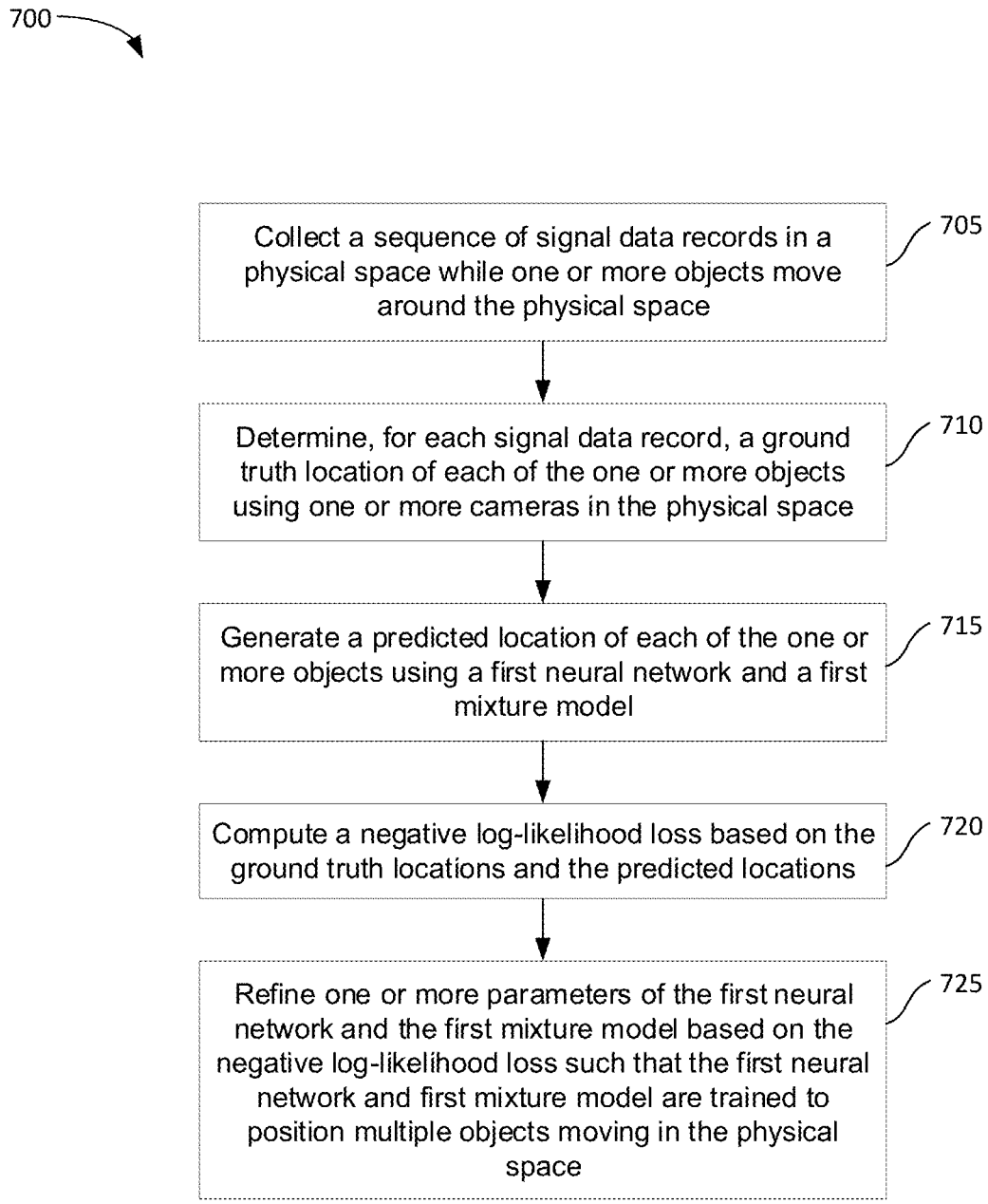
FIG. 7 is a flow diagram illustrating a method for training a mixture density network to provide object positioning based on signal data, according to some aspects disclosed herein.

FIG. 7 is a flow diagram illustrating a method 700 for training a mixture density network to provide object positioning based on signal data, according to some aspects disclosed herein.

The method 700 begins at block 705, where a positioning system collects a sequence of signal data records in a physical space while one or more objects move around the physical space.

At block 710, the positioning system determines, for each signal data record, a ground truth location of each of the one or more objects using one or more cameras in the physical space.

The method 700 then continues to block 715, where the positioning system generates a predicted location of each of the one or more objects using a first neural network and a first mixture model.

At block 720, the positioning system computes a negative log-likelihood loss based on the ground truth locations and the predicted locations.

Further, at block 725, the positioning system refines one or more parameters of the first neural network and the first mixture model based on the negative log-likelihood loss such that the first neural network and first mixture model are trained to position multiple objects moving in the physical space.

In some aspects, the method 700 additionally comprises generating a predicted number of objects in the physical space, and refining the one or more parameters of the first neural network and the first mixture model further comprises computing a cross entropy loss based in part on an actual number of the one or more objects and the predicted number of objects.

In some aspects, the method 700 further comprises identifying a number of the one or more objects, and generating a ground truth encoding tensor indicating the number. In at least one aspect, the method 700 also includes generating a ground truth location tensor based on the determined ground truth locations. Additionally, in at some aspects, the method 700 includes determining a respective uncertainty for each respective object of the plurality of objects, and generating ground truth uncertainty tensor based on the determined uncertainties.

In some aspects, determining the respective uncertainties comprises identifying a predefined fixed uncertainty measurement. In at least one aspect, the negative log-likelihood loss is computed based on the ground truth encoding tensor, the ground truth location tensor, and the ground truth uncertainty tensor.

Example System for Multi-Object Positioning Using Mixture Density Networks

In some aspects, the methods and workflows described with respect to FIGS. 3-7 may be performed on one or more devices. For example, training and inferencing may be performed by a single device or distributed across multiple devices.

By way of example, the positioning system may be comprised within a wireless router (or wireless access point, such as a mesh access point) providing wireless connectivity in a space, where the router includes a wireless sensing module that receives the wireless channel state information as input in order to perform inferencing for object localization in the space. In one such aspect, the deep learning (or neural network) engine core may be in the form of a graphics processing unit (GPU), digital signal processor (DSP), central processing unit (CPU), a neural processing unit (NPU), or another type of processing unit or integrated circuit.

Figure 8:
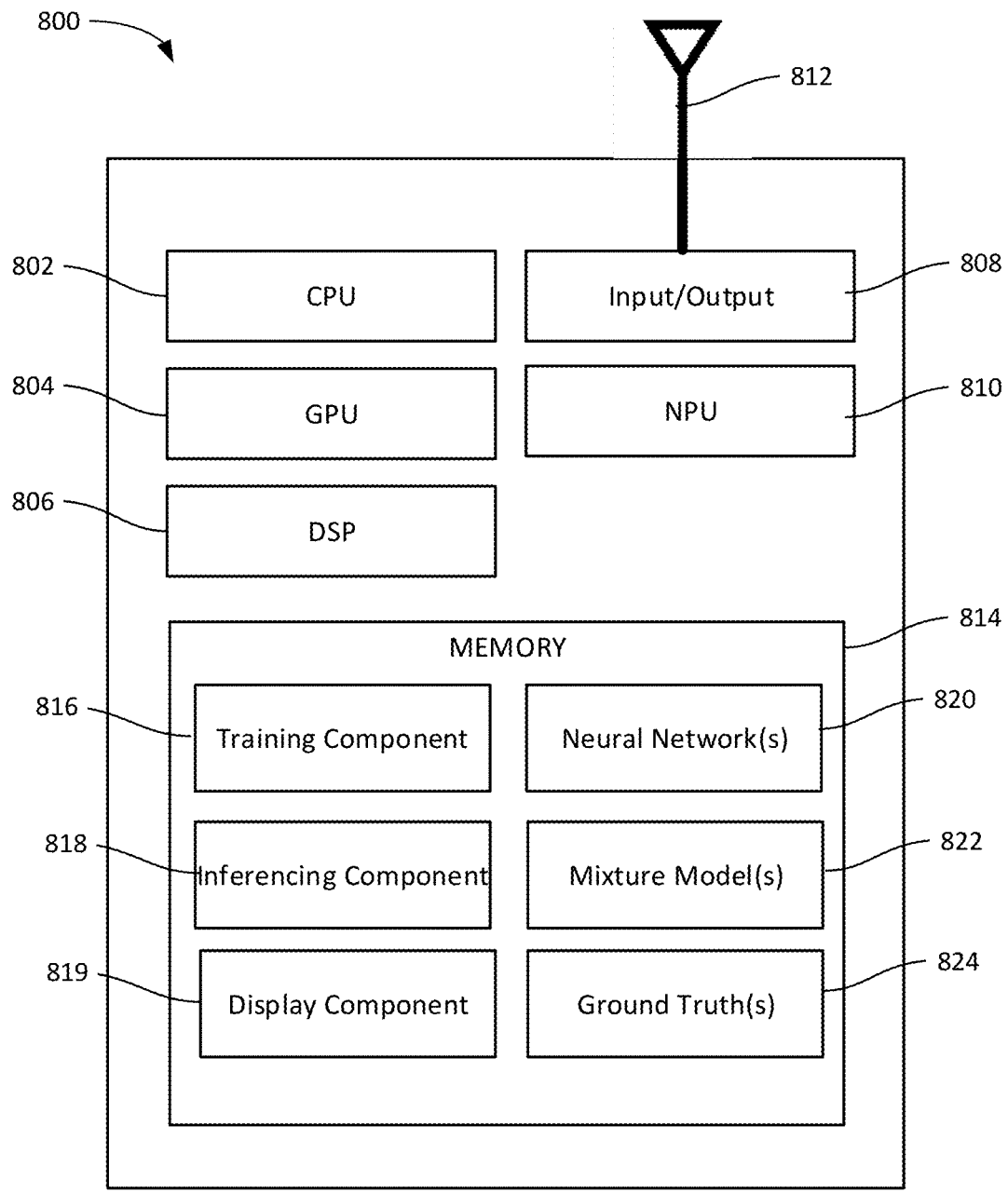
FIG. 8 is a block diagram illustrating a processing system configured to train and utilize mixture density networks for multi-object positioning, according to some aspects disclosed herein.

FIG. 8 is a block diagram illustrating a processing system 800 which may be configured to perform aspects of the various methods described herein, including, for example, the methods described with respect to FIGS. 3-7.

Processing system 800 includes a central processing unit (CPU) 802, which in some examples may be a multi-core CPU. Instructions executed at the CPU 802 may be loaded, for example, from a program memory associated with the CPU 802 or may be loaded from a memory 814.

Processing system 800 also includes additional processing components tailored to specific functions, such as a graphics processing unit (GPU) 804, a digital signal processor (DSP) 806, and a neural processing unit (NPU) 810.

Though not depicted in FIG. 8, NPU 810 may be implemented as a part of one or more of CPU 802, GPU 804, and/or DSP 806.

The processing system 800 also includes input/output 808. In the illustrated aspect, the input/output 808 is communicatively coupled with an antenna 812. For example, the input/output 808 may be coupled with one or more transmitters, receivers, and/or transceivers (e.g., transmitter 210 and receiver 215 in FIG. 2 and transceiver 110 in FIG. 1) in order to receive signal data. In aspects, the transmitted, receiver, and/or transceiver may be part of the processing system 800, or may be separate components or devices. In some aspects, the various components may be distributed, though operating as one system.

Although not included in the illustrated aspect, the processing system 800 may also include one or more additional input and/or output devices 808, such as screens, physical buttons, speakers, microphones, and the like.

Processing system 800 also includes memory 814, which is representative of one or more static and/or dynamic memories, such as a dynamic random access memory, a flash-based static memory, and the like. In this example, memory 814 includes computer-executable components, which may be executed by one or more of the aforementioned processors of processing system 800.

In this example, memory 814 includes a training component 816, an inferencing component 818, and a display component 819. The depicted components, and others not depicted, may be configured to perform various aspects of the methods described herein. For example, the training component 816 may be configured to receive and process signal data and ground truth 824 labels to train the neural network(s) 820 and mixture model(s) 822, and the inferencing component 818 may utilize the trained neural network(s) 820 and mixture model(s) 822 to process signal data in the space during runtime. The display component 819 may generate display predicted locations for each object (e.g., on a map depicted in a GUI).

In the illustrated aspect, the memory 814 includes a set of one or more neural networks 820 and a set of mixture models 822. In some aspects, each neural network 820 is associated with a corresponding mixture model 822 to jointly form an MDN. In at least one aspect, for each received used by the processing system 800, there is a corresponding neural network 820 and mixture model 822. Further, in the illustrated example, a set of ground truths 824 are retained. In some aspects, the ground truths 824 include historical signal data records, each record labeled with the actual number of objects, position of each, and uncertainty of each position.

Example Clauses

Clause 1: A method, comprising: receiving radio frequency (RF) signal data collected in a physical space; generating a feature vector encoding the RF signal data by processing the RF signal data using a first neural network; processing the feature vector using a first mixture model to generate: a first encoding tensor indicating a set of moving objects in the physical space, a first location tensor indicating a location of each of the moving objects in the physical space, and a first uncertainty tensor indicating uncertainty of the locations of each of the moving objects in the physical space; and outputting at least one location from the first location tensor.

Clause 2: The method of Clause 1, wherein the RF signal data comprises characteristics of RF signals in the physical space, and wherein the characteristics are a result of at least one of: RF fading, RF reflection, RF refraction, RF scattering, or RF attenuation.

Clause 3: The method of any of Clauses 1-2, wherein the first encoding tensor is a unidimensional tensor specifying a plurality of values, wherein each respective value of the plurality of values in the first encoding tensor indicates a probability that a respective moving object is in the physical space.

Clause 4: The method of any of Clauses 1-3, wherein for each respective value of the plurality of values: the first location tensor specifies a respective mean of a respective Gaussian distribution, and the first uncertainty tensor specifies a respective covariance matrix of the respective Gaussian distribution.

Clause 5: The method of any of clauses 1-4, wherein: the first neural network and first mixture model were trained based on data collected from a first receiver, a second neural network and second mixture model were trained based on data collected from a second receiver, and the method further comprises: aggregating a second location tensor from the second mixture model with the first location tensor from the first mixture model prior to outputting the at least one location.

Clause 6: The method of any of clauses 1-5, the method further comprising: determining a direction of movement for each moving object based on the first uncertainty tensor.

Clause 7: The method of any of clauses 1-6, the method further comprising: identifying a set of indices in the first encoding tensor having a value that exceeds a minimum threshold; for each respective index in the set of indices, identifying a corresponding location in the first location tensor; and outputting the identified corresponding locations in the first location tensor.

Clause 8: The method of clause 7, wherein the first mixture model was trained based at least in part on a map of the physical space, the map indicates valid regions which can be occupied by moving objects, and locations outside of the valid regions are penalized when generating the first location tensor such that locations outside of the valid regions are assigned lower probability values when generating the first location tensor.

Clause 9: The method of any of clauses 1-8, wherein outputting the at least one location comprises indicating the at least one location on a graphical map of the physical space.

Clause 10: A method, comprising: collecting a sequence of signal data records in a physical space while one or more objects move around the physical space; determining, for each signal data record, a ground truth location of each of the one or more objects using one or more cameras in the physical space; generating a predicted location of each of the one or more objects using a first neural network and a first mixture model; computing a negative log-likelihood loss based on the ground truth locations and the predicted locations; and refining one or more parameters of the first neural network and the first mixture model based on the negative log-likelihood loss such that the first neural network and first mixture model are trained to position multiple objects moving in the physical space.

Clause 11: The method of Clause 10, further comprising: generating a predicted number of objects in the physical space, wherein refining the one or more parameters of the first neural network and the first mixture model further comprises computing a cross entropy loss based in part on an actual number of the one or more objects and the predicted number of objects.

Clause 12: The method of any of Clauses 10-11, the method further comprising: identifying a number of the one or more objects; and generating a ground truth encoding tensor indicating the number.

Clause 13: The method of Clause 12, the method further comprising: generating a ground truth location tensor based on the determined ground truth locations.

Clause 14: The method of Clause 13, the method further comprising: determining a respective uncertainty for each respective object of the plurality of objects; and generating ground truth uncertainty tensor based on the determined uncertainties.

Clause 15: The method of Clause 14, wherein determining the respective uncertainties comprises identifying a predefined fixed uncertainty measurement.

Clause 16: The method of Clause 14, wherein the negative log-likelihood loss is computed based on the ground truth encoding tensor, the ground truth location tensor, and the ground truth uncertainty tensor.

Clause 17: A system, comprising: a memory comprising computer-executable instructions; and one or more processors configured to execute the computer-executable instructions and cause the processing system to perform a method in accordance with any one of Clauses 1-16.

Clause 18: A non-transitory computer-readable medium comprising computer-executable instructions that, when executed by one or more processors of a processing system, cause the processing system to perform a method in accordance with any one of Clauses 1-16.

Clause 19: A computer program product embodied on a computer-readable storage medium comprising code for performing a method in accordance with any one of Clauses 1-16.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    receiving radio frequency (RF) signal data collected in a physical space;
    generating a feature vector encoding the RF signal data by processing the RF signal data using a first neural network;
    processing the feature vector using a first mixture model to generate:
        a first encoding tensor indicating a set of moving objects in the physical space;
        a first location tensor indicating a location of each of the moving objects in the physical space; and
        a first uncertainty tensor indicating uncertainty of the locations of each of the moving objects in the physical space; and
    outputting at least one location from the first location tensor.

2. The method of claim 1, wherein the RF signal data comprises characteristics of RF signals in the physical space, and wherein the characteristics are a result of at least one of: RF fading, RF reflection, RF refraction, RF scattering, or RF attenuation.

3. The method of claim 1, wherein the first encoding tensor is a unidimensional tensor specifying a plurality of values, wherein each respective value of the plurality of values in the first encoding tensor indicates a probability that a respective moving object is in the physical space.

4. The method of claim 3, wherein for each respective value of the plurality of values:
    the first location tensor specifies a respective mean of a respective Gaussian distribution, and
    the first uncertainty tensor specifies a respective covariance matrix of the respective Gaussian distribution.

5. The method of claim 1, wherein:
    the first neural network and the first mixture model were trained based on data collected from a first receiver,
    a second neural network and second mixture model were trained based on data collected from a second receiver, and
    the method further comprises: aggregating a second location tensor from the second mixture model with the first location tensor from the first mixture model prior to outputting the at least one location.

6. The method of claim 1, the method further comprising: determining a direction of movement for each moving object based on the first uncertainty tensor.

7. The method of claim 1, the method further comprising:
    identifying a set of indices in the first encoding tensor having a value that exceeds a minimum threshold;
    for each respective index in the set of indices, identifying a corresponding location in the first location tensor; and
    outputting the identified corresponding locations in the first location tensor.

8. The method of claim 7, wherein:
    the first mixture model was trained based at least in part on a map of the physical space,
    the map indicates valid regions which can be occupied by moving objects, and
    locations outside of the valid regions are penalized when generating the first location tensor such that locations outside of the valid regions are assigned lower probability values when generating the first location tensor.

9. The method of claim 1, wherein outputting the at least one location comprises indicating the at least one location on a graphical map of the physical space.

10. A system, comprising:
    a memory comprising computer-executable instructions; and
    one or more processors configured to execute the computer-executable instructions and cause the system to perform an operation comprising:
        receiving radio frequency (RF) signal data collected in a physical space;
        generating a feature vector encoding the RF signal data by processing the RF signal data using a first neural network;
        processing the feature vector using a first mixture model to generate:
            a first encoding tensor indicating a set of moving objects in the physical space;
            a first location tensor indicating a location of each of the moving objects in the physical space; and
            a first uncertainty tensor indicating uncertainty of the locations of each of the moving objects in the physical space; and
        outputting at least one location from the first location tensor.

11. The system of claim 10, wherein the RF signal data comprises characteristics of RF signals in the physical space, and wherein the characteristics are a result of at least one of: RF fading, RF reflection, RF refraction, RF scattering, or RF attenuation.

12. The system of claim 10, wherein the first encoding tensor is a unidimensional tensor specifying a plurality of values, wherein each respective value of the plurality of values in the first encoding tensor indicates a probability that a respective moving object is in the physical space.

13. The system of claim 12, wherein for each respective value of the plurality of values:
    the first location tensor specifies a respective mean of a respective Gaussian distribution, and
    the first uncertainty tensor specifies a respective covariance matrix of the respective Gaussian distribution.

14. The system of claim 10, wherein:
    the first neural network and the first mixture model were trained based on data collected from a first receiver,
    a second neural network and second mixture model were trained based on data collected from a second receiver, and
    the operation further comprises: aggregating a second location tensor from the second mixture model with the first location tensor from the first mixture model prior to outputting the at least one location.

15. The system of claim 10, wherein the operation further comprises:
    determining a direction of movement for each moving object based on the first uncertainty tensor.

16. The system of claim 10, wherein the operation further comprises:
    identifying a set of indices in the first encoding tensor having a value that exceeds a minimum threshold;
    for each respective index in the set of indices, identifying a corresponding location in the first location tensor; and outputting the identified corresponding locations in the first location tensor.

17. The system of claim 10, wherein:
the first mixture model was trained based at least in part on a map of the physical space,
the map indicates valid regions which can be occupied by moving objects, and
locations outside of the valid regions are penalized when generating the first location tensor such that locations outside of the valid regions are assigned lower probability values when generating the first location tensor.

18. The system of claim 10, wherein outputting the at least one location comprises indicating the at least one location on a graphical map of the physical space.

19. A method, comprising:
collecting a set of signal data records in a physical space while one or more objects move around the physical space;
determining, for each signal data record, a ground truth location of each of the one or more objects in the physical space;
generating a predicted location of each of the one or more objects using a first neural network and a first mixture model;
computing a loss based on the ground truth locations and the predicted locations; and
refining one or more parameters of the first neural network and the first mixture model based on the loss such that the first neural network and the first mixture model are trained to position multiple objects moving in the physical space.

20. The method of claim 19, further comprising:
generating a predicted number of objects in the physical space, wherein refining the one or more parameters of the first neural network and the first mixture model further comprises computing a cross entropy loss based in part on an actual number of the one or more objects and the predicted number of objects.

21. The method of claim 19, the method further comprising:
identifying a number of the one or more objects; and
generating a ground truth encoding tensor indicating the number.

22. The method of claim 21, the method further comprising:
generating a ground truth location tensor based on the determined ground truth locations.

23. The method of claim 22, the method further comprising:
determining a respective uncertainty for each respective object of the plurality of objects; and
generating a ground truth uncertainty tensor based on the determined uncertainties.

24. The method of claim 23, wherein determining the respective uncertainties comprises identifying a predefined fixed uncertainty measurement.

25. The method of claim 23, wherein the loss is computed based on the ground truth encoding tensor, the ground truth location tensor, and the ground truth uncertainty tensor.

26. A system, comprising:
a memory comprising computer-executable instructions; and
one or more processors configured to execute the computer-executable instructions and cause the system to perform an operation comprising:
collecting a set of signal data records in a physical space while one or more objects move around the physical space;
determining, for each signal data record, a ground truth location of each of the one or more objects in the physical space;
generating a predicted location of each of the one or more objects using a first neural network and a first mixture model;
computing a loss based on the ground truth locations and the predicted locations; and
refining one or more parameters of the first neural network and the first mixture model based on the loss such that the first neural network and the first mixture model are trained to position multiple objects moving in the physical space.

27. The system of claim 26, wherein the operation further comprises:
generating a predicted number of objects in the physical space, wherein refining the one or more parameters of the first neural network and the first mixture model further comprises computing a cross entropy loss based in part on an actual number of the one or more objects and the predicted number of objects.

28. The system of claim 26, wherein the operation further comprises:
identifying a number of the one or more objects;
generating a ground truth encoding tensor indicating the number;
generating a ground truth location tensor based on the determined ground truth locations;
determining a respective uncertainty for each respective object of the plurality of objects; and
generating a ground truth uncertainty tensor based on the determined uncertainties.

29. The system of claim 28, wherein determining the respective uncertainties comprises identifying a predefined fixed uncertainty measurement.

30. The system of claim 28, wherein the loss is computed based on the ground truth encoding tensor, the ground truth location tensor, and the ground truth uncertainty tensor.

* * * * *